P. J. SIBERLING.
Blackboard Eraser.

No. 233,378.  Patented Oct. 19, 1880.

UNITED STATES PATENT OFFICE.

PERRY J. SIBERLING, OF WATERLOO, IOWA.

BLACKBOARD-ERASER.

SPECIFICATION forming part of Letters Patent No. 233,378, dated October 19, 1880.

Application filed February 6, 1880.

*To all whom it may concern:*

Be it known that I, PERRY J. SIBERLING, of Waterloo, in the county of Blackhawk and State of Iowa, have invented certain new and useful Improvements in Blackboard-Rubbers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in blackboard-rubbers; and it consists, essentially, in a novel and improved mode of attaching the rubbing fabric to the head-block so as to be readily removable.

Figure 1:
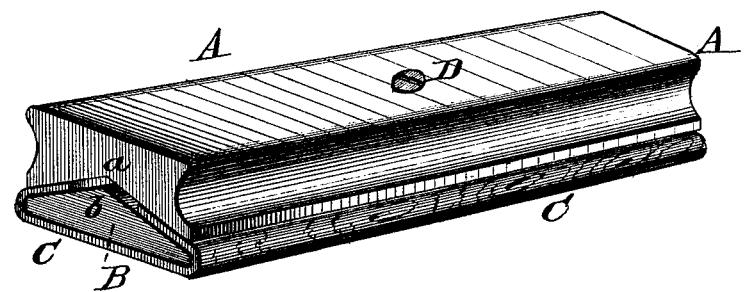
Figure 2:
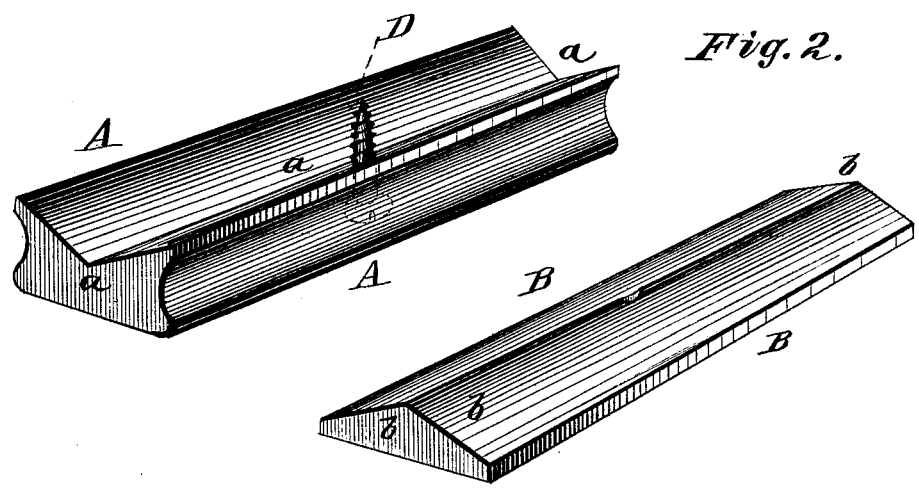
Figure 3:
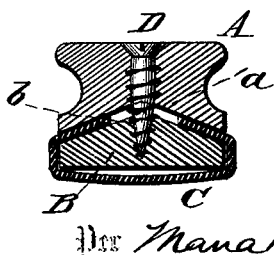

In the drawings, Figure 1 is a perspective view of my invention complete. Fig. 2 shows detached views of the inner surfaces of the compressing-blocks A and B. Fig. 3 is a central vertical section.

A is a block of wood, of any desired length and thickness, having grooved sides suitable for the reception of the thumb and fingers of the operator in grasping the same. On the lower side of the block A is formed, longitudinally, the angular recess $a$ the entire length of the block.

B is a companion block or follower, of the same length and width of the block A, and having its upper side, $b$, shaped conformably to the recess $a$ in the lower side of the block A.

C is a piece of carpet, rubber, cloth, or other suitable erasing fabric, of the length of the block B, and of sufficient width to cover the lower side and extend partially over the upper surface of the block B.

D is a draw-screw, seated at or near the center of the block A, and passing down through the latter at the upper angle of the recess $a$, and engaging a corresponding thread cut in the apex of the upper side of the block B.

The block B is placed upon the erasing fabric C, and the respective edges of the latter folded over the edges and upon the upper side, $b$, of the block B. The angular upper side, $b$, of the block B, thus inclosed, is then placed in the recess $a$ of the block A, and by means of the screw D the angular upper side, $b$, of the block B is drawn into the recess $a$ with any desired degree of compression. Thus the erasing fabric C is firmly held between the compressing-surfaces of the blocks A and B. When the fabric C is worn out, or becomes useless from smoothness or being filled with dirt, it is readily removed and its place supplied by a new piece by withdrawing and retightening the screw D. One pair of blocks will outlast and can be thus used for many successive erasing fabrics.

The advantage in the use of the recess $a$ and the following-block B, as shown, is that I obtain thereby the mechanical advantage of the wedge, and therefore secure a greater pressure upon the upper edges of the fabric C with the same screw-power than if the opposing surfaces of such blocks were planes. By thus utilizing the screw and wedge power in conjunction I am enabled, with an ordinary screw, to acquire a degree of compression hitherto unattained. I do not limit myself to any particular angle in the sides of the recess $a$; but that shown (of one hundred and twenty degrees) will operate satisfactorily. Neither do I limit myself to the use of but one screw, nor to an angular recess as distinguished from a grooved recess.

The blocks A and B can be made originally in one piece and afterward sawed apart. If desired, a threaded nut to receive the screw C can be countersunk in the lower face of the block B.

I am aware that a blotter consisting of a rounded wooden body over which the blotting-paper is placed, said wooden body having a central recess in its upper side having inclined end walls, a block having inclined edges adapted to fit said recess, and between which blocks the ends of the blotting-paper are secured through the medium of a screw, is old, and such I distinctly disclaim as of my invention.

What I claim as my invention, and desire to secure by Letters Patent of the United States, is—

The herein-described blackboard-eraser, consisting of the upper block, A, having a longitudinal angular recess, $a$, on its under side, extending from one side to the other of said block, and a screw, D, a block, B, having an angular upper surface, $b$, extending from side to side thereof, and a lower flat surface, and a fabric, C, covering the lower surface of said block B, with its ends interposed and clamped between said blocks, as and for the purpose specified.

In testimony that I claim the foregoing I have hereunto set my hand this 29th day of January, 1880.

PERRY J. SIBERLING.

Witnesses:
LINCOLN C. WARE,
EMMONS JOHNSON.